MAGNETIC REFRIGERATOR HAVING THERMAL VALVE MEANS

Original Filed Oct. 15, 1956

2 Sheets-Sheet 1

INVENTOR.
RICHARD L. GARWIN
BY Paul McElow
ATTORNEY

Nov. 24, 1959 R. L. GARWIN 2,913,881

MAGNETIC REFRIGERATOR HAVING THERMAL VALVE MEANS

Original Filed Oct. 15, 1956 2 Sheets-Sheet 2

INVENTOR
RICHARD L. GARWIN
BY Paul McEnlow
ATTORNEY 2,913,881

MAGNETIC REFRIGERATOR HAVING THERMAL VALVE MEANS

Richard L. Garwin, Scarsdale, N.Y., assignor to International Business Machines Corporation, New York, N.Y., a corporation of New York Original application October 15, 1956, Serial No. 615,814. Divided and this application November 27, 1957, Serial No. 699,398

8 Claims. (Cl. 62—3)

The present invention relates to superconducting elements for storing induced persistent currents and more particularly, to the use of induced persistent currents for controlling the thermal conductivity of other elements having superconductive characteristics. This application is a division of co-pending application, Serial No. 615,814, filed October 15, 1956.

It is known that the electrical resistance of a material decreases with temperature and that certain materials become superconducting when they are cooled to a temperature close to absolute zero (0° K.). When a material is in a superconductive state, its resistance is equal to zero. It is also known that a conductor having super-conductive characteristics may be utilized as a thermal heat switch wherein the normal or superconductive states, respectively, of the conductor passes a heat current easily or acts as a thermal insulator.

When a magnetic field is applied to a superconducting material, the normal resistance of the material is restored and the material ceases to be superconductive at a predetermined field strength which is a function of the temperature and the characteristics of the material. This field strength is known as the critical field of the material. The prior art includes devices wherein the two states (i.e., the normal and superconductive states) of a conductor exhibiting superconductive properties are utilized to represent the storage of information or to effectuate logical control functions. In such structures the conductor is superconductive when the external magnetic field is less than the critical field and is rendered normal then the magnetic field exceeds the critical field. In order to maintain such a conductor in a superconductive state, no external electrical energy need be applied to a circuit incorporating the conductor; but the second state, i.e., the normal state, is maintainable only through the continuous application of a magnetic field to the conductor. This magnetic field is generally produced by a coil surrounding the conductor, and thus necessitates the continual application of electrical current to the coil in order to maintain the normal state.

The present invention utilizes the phenomenon of induced persistent currents induced in a closed current path fabricated from superconductive material. When a closed current path is entirely superconductive, a current induced therein will persist since the resistance of the path is zero. A persistent current continues to circulate in the path without the continuous application thereto of electrical energy from an external source. A persistent current is eliminated only by rendering a portion of the path normal for a time sufficient to dissipate the current in the normal resistance introduced in the path. Thus, a closed current path formed of superconductive material may exhibit two states which are represented by the presence or absence of a persistent current therein. Also, the magnitude of a current can be stored in the closed path, as where the relative magnitudes of several currents are representative of information.

The present invention relates to the storage of persistent currents in a continuous loop of superconductive material to control the thermal conductivity characteristics of a superconductive element being used as a heat switch. The invention may be used to control the flow of heat in a cooling device to establish a refrigeration cycle.

A superconductive material exhibits relatively high and low thermal conductivity in its normal and superconductive states, respectively. The heat switch includes an additional superconductive element for controlling the flow of heat and is disposed adjacent to a portion of the superconductive storage loop. The magnetic field created by a persistent current in said loop renders the additional element normal, thus permitting the passage of heat therethrough. Thus the presence or absence of a persistent current in the superconductive loop respectively renders said additional element normal or superconductive to thereby provide a heat switch capable of controlling thermal conductivity of an element without requiring the continuous application of electrical energy to the switch.

Each superconductive storage loop referred to herein as a storage cell may comprise a single material, or may be fabricated of two superconductive materials arranged in series, one having a higher critical field than the other. Means are provided adjacent to each storage cell to selectively induce therein, during a Store interval, a persistent current or no current, and further means are provided to sense, during a Read interval, a representation of the presence or absence of a persistent current in the loop.

During a Store interval, a magnetic field greater than the critical field, is applied to a storage cell to render at least a portion thereof normal. The normal resistance of the normalized portion of the loop dissipates any persistent current previously circulating within the loop. At the termination of the Store interval, the magnetic field is removed thereby permitting the entire loop to return to its superconductive state. If flux from a magnetic field is permitted to encompass a predetermined portion of the storage cell following the transition from the normal to the superconductive state, a persistent current is induced in the loop when said flux is removed. The persistent current circulates in the storage loop as long as the loop remains entirely superconductive. However, if following the transition from the normal to the superconductive state at the termination of the Store interval, there is no flux linking said predetermined portion of the loop, a persistent current is not induced therein.

A principal object of the invention is to provide a novel means for controlling heat flow in a refrigerator.

Another object is to provide novel means for inducing and storing a persistent current in a closed current path fabricated from superconductive materials whereby the persistent current flowing in said path controls the thermal conductivity of a further superconductive element.

A further object is to provide a novel control circuit for controlling the thermal conductivity of a conductor including first and second superconductive materials arranged serially in a closed current path and having different critical field values, said conductor being disposed adjacent said first or said second material, means for rendering one of said materials normal by exceeding the critical field thereof, and further means for inducing a persistent current in said closed current path by selectively controlling the application of a magnetic field to said field, thereby controlling the thermal conductivity of said conductor by the presence or absence of said persistent current.

Another object is to provide a refrigerator having an improved thermal valve which is controlled by persistent currents flowing in a superconducting path whereby said valve controls heat exchange in said refrigerator.

A further object is to provide a refrigerator having an improved thermal switch for controlling heat flow therein, said switch employing a superconducting thermal element which respectively functions as a thermal conductor or a thermal insulator when it is in the normal or superconductive state, the state of said thermal element being controlled by the presence or absence of a persistent current circulating in a conductor adjacent to said element.

Another object is to provide means for utilizing a persistent current flowing in a superconducting medium to control the extracting of heat from a low temperature reservoir by magnetic work producing means.

An object is to provide a novel means for controlling thermal links for selectively providing a heat current path between a paramagnetic salt and a constant temperature reservoir or a low temperature reservoir from which heat is extracted.

It is also an object to provide an improved adiabatic demagnetization refrigerator having a paramagnetic salt as a working substance, a first high temperature reservoir, a second low temperature reservoir, a first thermal switch comprising a thermal link the superconductive state of which is controllable by a persistent current circulating in a superconducting loop, said first switch disposed between said salt and said first reservoir, and a second thermal switch similar to said first switch and disposed between said salt and said second reservoir.

A further object is to provide means for controlling a superconductive heat switch through the use of an induced persistent current circulating in a superconductive loop.

Other objects of the invention will be pointed out in the following description and claims and illustrated in the accompanying drawings, which disclose, by way of example, the principle of the invention and the best mode, which has been contemplated, of applying that principle.

Figure 1:
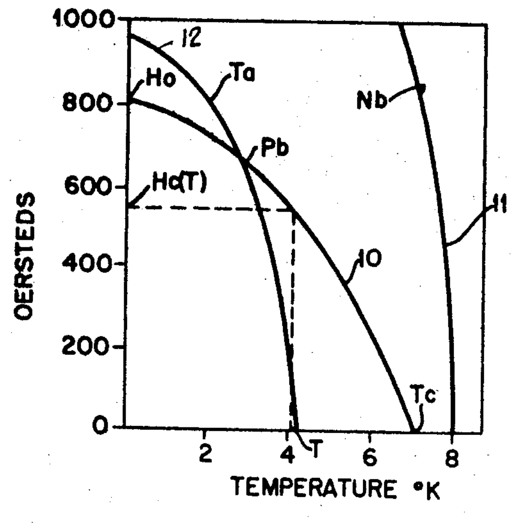
Fig. 1 is a graph of magnetic field versus temperature for a typical superconductive material.

For each superconductive material a graph of magnetic field versus temperature can be plotted which characterizes the important properties of the particular superconductor. The transition curves for lead, niobium, and tantalum are shown in Fig. 1 as curves 10, 11 and 12. A material is said to be in a superconductive state when the relationship between the applied magnetic field and the temperature of the material is such that the intersection of these values lies in the area beneath the curve of Fig. 1 corresponding to the material. However, if either the temperature or the magnetic field surrounding the material is increased whereby the intersection of these values occurs in the area above the appropriate curve, the material is said to be in the "normal" state.

With respect to Fig. 1, consider that the superconductor is lead, for example, and is cooled to temperature T. As long as the magnetic field applied to the conductor is less than the value $H_c(T)$, the conductor will exist in a superconductive state. If the magnetic field is now increased above the value $H_c(T)$, the conductor is transformed to the normal conductive state. The field strength $H_c$ at which the transition from the superconductive to the normal state occurs is called the critical field. Hence, it is seen that when the temperature of a superconductor is maintained at a constant value, the increasing and decreasing of the magnetic field controls the resistance of the conductor by causing the properties thereof to shift back and forth between its superconducting normal states respectively. Fig. 1 also indicates that in order to control the conductive state of a superconductor by controlling the magnetic field, the temperature of the conductor must be maintained at a value below the transition temperature corresponding to zero magnetic field.

The magnetic field may be an externally applied field or may be produced by the current flowing through the superconductive element, or may be a combination of both of these fields. The critical magnetic field $H_c(T)$ limits the current which can be passed through the superconductor without destroying the superconductive state. The magnetic field at the surface of a cylindrical conductor, due to the current flowing therethrough, is equal to $2I_c/10r$, where $r$ is the radius of the wire in centimeters and $I_c$ is the critical current corresponding to the critical field $H_c(T)$.

With respect to curves 10 and 11 (Fig. 1) note that when the system is operating at approximately 4° K., for example, the critical field $H_c(T)$, sufficient to render a lead conductor normal (curve 10), is insufficient to render a niobium conductor normal. From the plot of Fig. 1, it is obvious that the critical field for niobium at 4° K. is many times larger than the critical field for lead. Thus it is clear that several superconducting elements being operated in the same vicinity are responsive to different field strengths so that the state of one superconductive element can be controlled by the magnetic field in the vicinity without affecting the state of other nearby conductors having a higher critical field. Where a superconductive material such as lead, for example, is utilized in the vicinity of another material, such as, niobium, and the respective materials have radically different critical fields, the material having the lower critical field is referred to as a "soft" superconductor, whereas the material having the greater critical field is referred to as a "hard" superconductor.

While Fig. 1 only illustrates the transition curves for lead, niobium, and tantalum, a similar curve can be plotted for any superconductive material. The nature of tin, for example, is such that a plot of its transition curve would appear beneath curve 10 of Fig. 1. When it is desired to obtain a material having a critical field intermediate, a first material such as tin, for example, and a second material such as lead, for example, a homogeneous alloy of the two materials may often be used in order to provide a material having the desired intermediate critical field value.

Under certain conditions it is desirable that a superconductive material, when rendered normal, exhibit a high normal resistance. A higher resistance can be obtained by plating a superconductive material such as lead, for example, onto a graphited plastic base. The increased resistivity appears only when the material is normalized, and is shorted when it becomes superconductive.

It is known that when a magnetic flux links a loop of material at the time that said material passes from its normal to its superconductive state and the flux is later removed, a current is induced in the loop which thereafter persists and continues to circulate therein. Such a current is known as a persistent current. A persistent current will circulate in a superconducting loop until a portion of the loop is rendered normal whereby the normal resistance of the normalized portion is introduced into the loop. A persistent current is dissipated in the normal resistance referred to above.

An excellent discussion of the thermal properties of materials exhibiting superconductive characteristics is set forth in Chapter 3 of the reference by D. Schoenberg identified hereinbelow.

In the following description, the term "Store interval" is used to refer to a time interval during which the presence or absence of a persistent current may be selectively stored in a superconducting loop. The term "Read interval" is used to refer to a time interval during which the presence or absence of a persistent current in a superconducting loop is detected.

Further information concerning superconductive materials, theories of superconductivity and a synopsis of the experiments performed to date on superconductive materials may be found in the following: D. Schoenberg, "Superconductivity," second edition, The Syndics of the Cambridge University Press, London, England (1952); M. Von Laue, "Theory of Superconductivity," Academic Press Inc., New York, N.Y. (1952); and D. A. Buck, "The Cryotron—A Superconductive Computer Component," Proceedings of the I.R.E., vol. 44, No. 4, pp. 482–493, April 1956. These references also include further references to literature relating to methods of obtaining operating temperatures near 0° K. by apparatus utilizing liquid helium.

Figure 2:
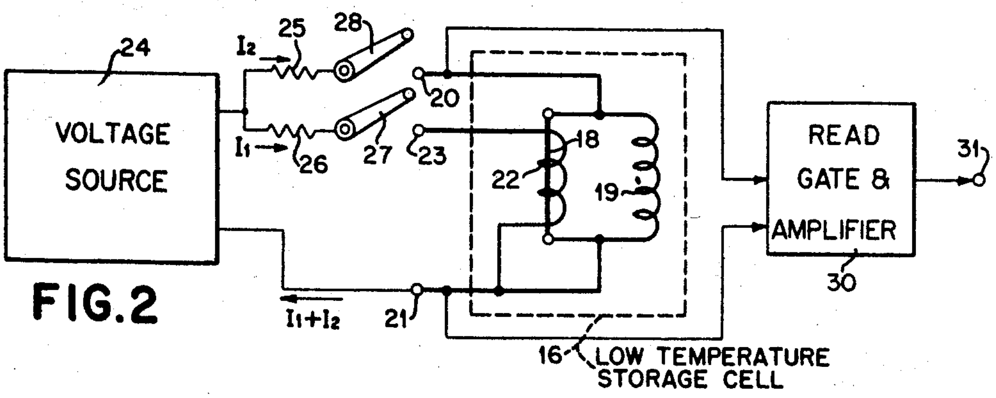
Fig. 2 is a circuit diagram of a superconductive storage loop for storing a persistent current.

Referring more particularly to Fig. 2, a novel circuit for inducing and storing a persistent current in a superconducting loop is illustrated. All of the components shown within the dashed rectangle 16 of Fig. 2 are maintained at a temperature corresponding to temperature T, for example, of Fig. 1. The temperature at which these elements must be maintained is dependent upon the superconductive materials utilized, and may be in the range of 2° K. to 5° K.

The superconductive storage loop of Fig. 2 comprises a conductor 18 and an inductance 19 connected in parallel between terminals 20 and 21. Conductor 18 is fabricated from a superconductive material having a relatively smaller critical field than the critical field associated with the superconductive material from which inductance 19 is fabricated. If preferred, conductor 18 and inductance 19 may be fabricated from materials having similar critical fields, in which case they must be physically separated so that a magnetic field applied to one does not affect the other. As explained hereinbelow, the inductance 19 always remains superconductive, whereas conductor 18 will be shifted between its normal and its superconductive state. An inductance 22 surrounds conductor 18 and may be fabricated from a superconductive material having a relatively high critical field as compared with conductor 18. However, it is not essential to the invention that this inductance be superconductive. Inductance 22 is connected between terminals 23 and 21. Inductance 22, like inductance 19, always remains in the superconductive state.

A voltage source 24 is connected to supply a current between terminal 21 and resistors 25 and 26 which are respectively connected between the source 24 and switches 27 and 28.

A read gate and amplifier circuit 30 is provided which receives the voltage signals developed between terminals 20 and 21. The output of the read circuit is connected to terminal 31. The read circuit 30 is gated so as to amplify any voltage signal appearing at terminals 20 and 21 during a Read interval. Where the device of Fig. 2 is used to control a thermal switch in a refrigerator, the read gate and amplifier circuit 30 may be eliminated, or alternatively in a complex arrangement, may be used to indicate the status of the thermal switch.

Briefly, the switches 27 and 28 of Fig. 2 are actuated in the proper sequence to induce a persistent current in the loop comprising conductor 18 and inductance 19. After a persistent current is induced in the loop, the current continues to circulate therein without the application of electrical energy from an external source. The persistent current will continue to circulate in the loop indefinitely or until some portion of the loop, such as conductor 18, is rendered normal for a period of time sufficient to permit the current to be dissipated in the normal resistance of the conductor. The conductive state of conductor 18 is controlled by the magnetic field surrounding inductance 22. For example when a current is flowing through inductance 22, having a value sufficient to create a field greater than the critical field of conductor 18, the latter is rendered normal. Upon the removal of this field, conductor 18 reverts to the superconductive state. The current applied to the inductances 22 and 19 of Fig. 2 must be limited so that the fields created about the inductances do not render the inductances themselves normal, but rather permit the inductances to always remain in the superconductive state.

The material comprising conductor 18 may be selected to have a lower critical field than the material comprising inductances 19 and 22. Thus conductor 18 may be fabricated, for example, of lead or tantalum and the remaining conductors within rectangle 16 of Fig. 2 may be composed of niobium. However, there are many materials such as vanadium, aluminum, tin, titanium, and alloys thereof, to name only a few, which exhibit superconductive properties and may be used for the superconductive elements of Fig. 2.

Consider, for example, that all the conductors within the rectangle 16 of Fig. 2 are in their superconductive states. If switch 27 is closed, a current $I_1$ supplied by voltage source 24 is applied through the switch to terminal 23, through inductance 22 to terminal 21 and returns to the generator 24. Current $I_1$ applied to inductance 22 must be sufficient to produce a magnetic field within the inductance having a magnitude greater than $H_c(T)$ so as to destroy the superconductive state of conductor 18. Hence, whenever switch 27 is closed, conductor 18 is made normal.

If, while switch 27 remains closed, switch 28 is closed, current $I_2$ is applied via terminal 20 to the parallel combination of conductor 18 and inductance 19. This current returns via terminal 21 to voltage source 24. Current $I_2$ flows entirely through the superconducting inductance 19 since the inductance has no resistance, whereas conductor 18 is now exhibiting its normal resistance due to the magnetic field created by inductance 22. Several settling times must transpire before the current is flowing entirely through the inductance 19.

Switch 27 is now opened causing the field within inductance 22 to collapse, thus rendering conductor 18 normal. The current $I_2$ continues to flow through inductance 19 even though conductor 18 is now superconductive. Thereafter, switch 28 is opened and the current in inductance 19 attempts to decrease. The energy stored in the inductance forces the current flowing therein to flow through conductor 18. Since conductor 18 is now superconducting, the current flowing in inductance 19 begins to circulate as a persistent current in the storage loop comprising inductance 19 and conductor 18. The persistent current induced in the loop is proportional to the magnitude of the current flowing through inductance 19 and in most cases is very nearly equal to it.

The induced persistent current circulates in the storage loop without the further application of current thereto. This persistent current will continue to circulate for several years without any appreciable change in magnitude, providing the superconductive loop is maintained at the proper temperature and is not subjected to an external magnetic field greater than the critcal field of any of the components of the loop.

The persistent current circulating within the storage loop can be destroyed by closing switch 27 for several settling times. The closure of switch 27 establishes a magnetic field within inductance 22 which destroys the superconductive state of conductor 18. The persistent supercurrent is then dissipated by the normal resistance of conductor 18.

In certain applications, as where the storage cell is utilized as a memory device, for example, it is desirable to sense the existence of a persistent current in the storage cell of Fig. 2. During a Read operation, switch 28 remains open. The closure of switch 27 causes a current to flow through inductance 22, thereby applying a magnetic field to conductor 18. The superconductivity of conductor 18 is destroyed by the magnetic field, and the conductor exhibits its normal resistance. The persistent current circulating through inductance 19 and conductor 18 decreases when it encounters the normal resistance R of conductor 18. The current through conductor 18 produces a voltage signal between terminals 20 and 21. This signal is gated and amplified by the read gate and amplifier circuit 30 of Fig. 2 and appears at output terminal 31. The read-out signal appearing at terminal 31 can be applied to any suitable circuitry, such as the read-in circuits of a digital computer.

It is to be appreciated that the switches 27 and 28 of Fig. 2 are merely symbolic, and normally comprise electronic or superconductive switching means.

One of the advantages of the invention is that the storage of a persistent current may be of a permanent nature. In an apparatus which utilizes the invention, for example, the stored current is not loss when the power supplies fail. Further, the persistent current type storage cell is easily constructed and economically operated. The circuit of Fig. 2 may also be used in an analog type computer and in other storage and control applications, since the persistent current induced in the storage loop is proportional to the field about inductance 19. That is, the circuit may be used to store the magnitude of a current.

It should be stressed that once information is stored as a persistent current in a superconductive loop, the information is continuously stored as long as the entire loop remains superconductive. Thus, in order to destroy the stored information, at least a portion of the superconductive loop must be rendered non-superconductive for several settling times. Such a loop can be rendered non-superconductive by raising the temperature above the transition temperature, or by applying thereto a magnetic field greater than the critical field.

Figures 3, 4:
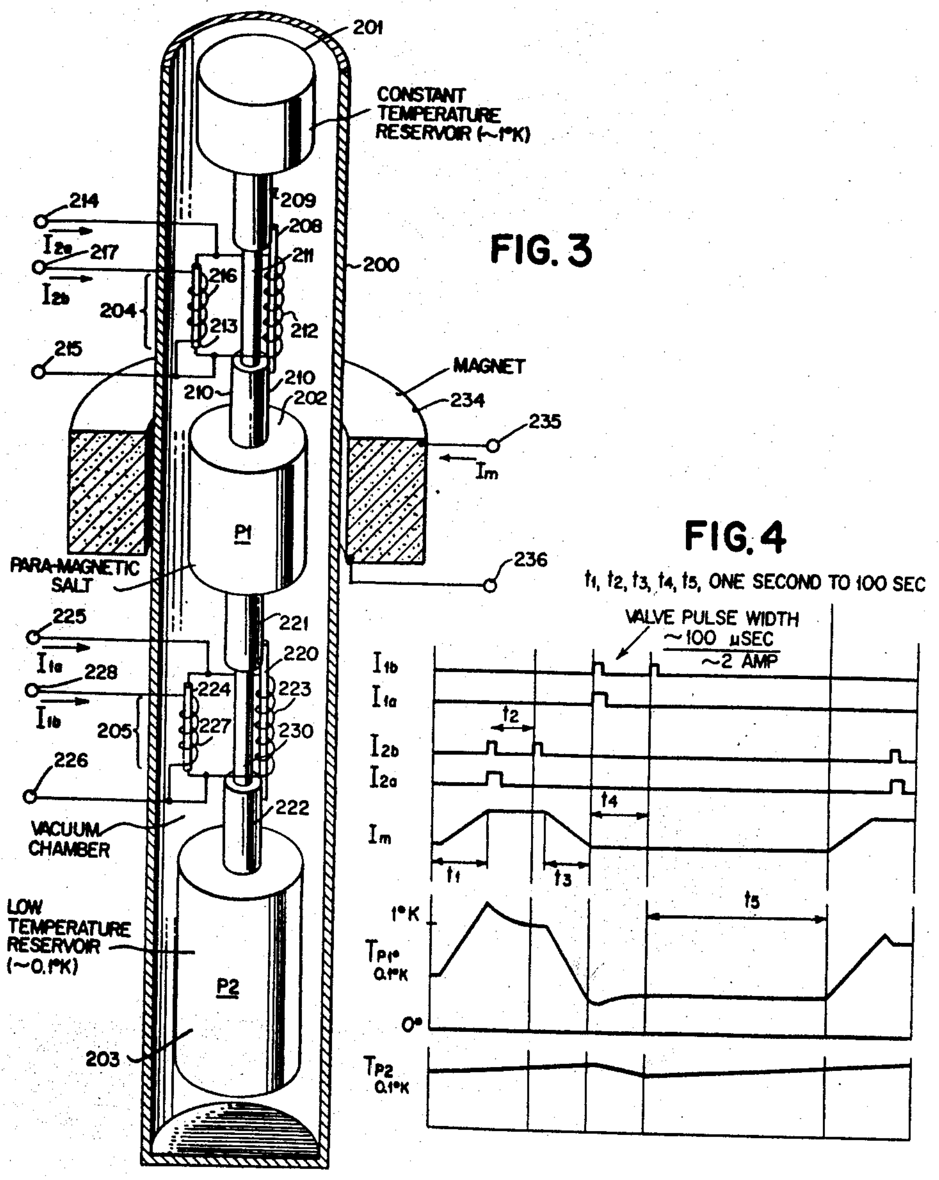
Fig. 3 illustrates an adiabatic demagnetization refrigerator utilizing stored persistent currents for control purposes.
Fig. 4 depicts an operation cycle of the apparatus of Fig. 3.

Referring more particularly to Fig. 3 an adiabatic demagnetization refrigerator incorporating the invention for controlling a thermal heat switch is illustrated. It is known that a conductor having superconductive characteristics may be utilized as a thermal heat switch wherein the normal or superconductive state of the conductor respectively passes a heat current easily or acts as a thermal insulator. Thus by placing a superconducting conductor within the inductance 19 of Fig. 2, the novel circuit of Fig. 2 may be utilized to control the thermal properties of said conductor, thereby providing a thermal heat switch. The opening or closing of the heat switch is respectively determined by whether or not a magnetic field greater or less than the critical field is applied to the conductor. The selective application of such a magnetic field may be effected by controlling a persistent current circulating in a superconducting storage cell of the type described hereinbefore.

Superconductive thermal switches are found in the prior are wherein the magnetic field used to control the superconductive element is provided by an electromagnet surrounding said element. In order to maintain the element in the thermal conducting state, a current of several amperes must be continuously supplied to the electromagnet. Accordingly, the large power requirements of the electromagnet demand that the power supplies be capable of delivering large currents for time intervals up to 100 seconds. These requirements dictate substantial and more costly power equipment. Further considerable power is dissipated in the electromagnet.

In the novel thermal switch described herein the necessity for a sustained current to provide the required magnetic field is eliminated. A superconducting loop including an inductance is provided. The inductance is disposed adjacent the superconducting thermal element. Current pulses are utilized to induce a persistent current in the superconducting loop. Once established, the persistent current circulates in the loop without the further application of electrical energy thereto. The persistent current flowing through the inductance creates a magnetic field which renders the element thermally conductive. Since the current pulses which induce the persistent current are of less than fifty microseconds duration, the equipment necessary to produce them is less costly than the heavy-duty power supplies heretofore required. Also, there is no power dissipation in the loop, thus increasing the efficiency of the entire system.

The low temperature components of the demagnetization refrigerator are enclosed within the thermal insulating vacuum chamber 200 of Fig. 3. The container 201 of Fig. 3 serves as a constant high temperature reservoir and is generally filled with liquid helium which has a temperature of approximately 1° K. However, other substances may be used in container 201 in order to provide a different reference temperature. Container 202 is filled with a paramagnetic salt such as iron-ammonium alum or chromium potassium alum, and is referred to herein as salt pill $P_1$. The paramagnetic salt is used to perform the work accomplished in obtaining a temperature lower than the reference temperature of the reservoir 201. A paramagnetic salt is also used as a low temperature reservoir which is housed in container 203. The low temperature reservoir is referred to herein as salt pill $P_2$.

The constant-temperature reservoir 201 is coupled to the paramagnetic salt pill $P_1$ by thermal switch 204 and salt pill $P_2$ is coupled to the working substance $P_1$ by the thermal switch 205. Briefly, the paramagnetic salt pill $P_1$ which serves as the working substance is magnetically controlled to absorb heat flowing from the low temperature reservoir $P_2$, and the constant temperature reservoir 201, in turn, absorbs heat from the working substance $P_1$.

Heat switch 204 includes a thermal link 208 fabricated from a superconducting material. The link 208 may, for example, be pure lead which exhibits good thermal conductivity in the non-superconducting state. Thermal link 208 is bonded to members 209 and 210 which respectively provide a good thermal conductive path from the link to container 201 and the working substance $P_1$. A thermal insulating member 211 supports the thermal conducting members 209 and 210.

The superconductive or normal state of thermal link 208 is controlled by inductance 212 which is connected in parallel with a superconducting conductor 213. Conductor 213 may be fabricated from an alloy of tin and lead, for example, in order to reduce the critical field required to normalize the conductor. A first juncture of conductor 213 and inductance 212 is connected to terminal 214, and the second juncture of these members is connected to terminal 215. The conductor 213 is surrounded by the superconducting inductance 216 which is connected between terminals 215 and 217. A brief comparison of thermal switch 204 with the circuit of Fig. 2 indicates that terminals 214, 217 and 215 (Fig. 3) respectively correspond to terminals 20, 23 and 21 of Fig. 2.

A thermal link 220 of heat switch 205 is bonded to members 221 and 222 which respectively serve as thermal conductors between link 220, the working substance $P_1$ and reservoir $P_2$. A superconducting inductance 223 surrounds thermal link 220 and is connected in parallel with a superconductive conductor 224. The two junctures of the parallel combination of conductor 224 and inductance 223, are respectively connected to terminals 225 and 226. A further superconducting inductance 227 surrounds conductor 224 and is connected between terminals 228 and 226. The thermal conducting members 221 and 222 are supported by a thermal insulating member 230. It is to be noted that the construction of thermal switch 205 is identical with switch 204.

As stated hereinabove, thermal switch 204, for example, serves to control the flow of heat currents between working substance $P_1$ and constant temperature reservoir 201. When the thermal link 208 is rendered normal, the thermal resistance of the link is relatively low so that heat currents are permitted to pass therethrough. However, when the link 208 is in the superconductive state, it acts essentially as a thermal insulator. When a persistent current is circulating in the superconductive loop comprising inductance 212 and conductor 213, a magnetic field is created around inductance 212 which is applied to thermal link 208. This field is greater than the critical field of link 208 and thus renders it normal so that heat currents may pass therethrough. On the other hand, if a persistent current is not circulating within the parallel combination of inductance 212 and conductor 213, the thermal link remains in its superconductive state so as to act as a thermal insulator. The manner in which a persistent current is induced in the parallel combination of inductance 212 and conductor 213, is described hereinabove with respect to Fig. 2. Thus it is seen that a persistent current circulating in a superconducting closed current path may be used to control a thermal link fabricated of superconductive material, thereby providing the functions of a thermal switch.

The work performed within the demagnetization refrigerator is effectuated by magnetizing and demagnetizing the paramagnetic salt $P_1$ constituting the working substance. The magnetic properties of the working substance are controlled by electromagnet 234 which is arranged external to vacuum chamber 200. The winding of the electromagnet is respectively connected between terminals 235 and 236.

Briefly, the cycle of operation of the adiabatic demagnetization refrigerator is as follows. Firstly, the paramagnetic salt $P_1$ is magnetized by applying a current $I_m$ to terminals 235 and 236. Secondly, a persistent current is established in thermal switch 204 so that the paramagnetic salt 202 is thermally connected to the constant temperature bath 201. The heat of magnetization created within the paramagnetic salt $P_1$ is then conducted to the constant temperature reservoir 201 through the normalized thermal link 208. Thirdly, the persistent current circulating in thermal switch 204 is destroyed so that thermal link 208 becomes superconductive thereby thermally insulating paramagnetic salt $P_1$ from the constant temperature reservoir 201. Fourthly, the current $I_m$ is decreased so that the paramagnetic salt 202 is demagnetized. Fifthly, a persistent current is established in thermal switch 205 so as to normalize the thermal link 220. The link 220 then provides a thermal path from the reservoir 203 to the paramagnetic salt 202. Upon demagnetization, the salt pill $P_1$ cools to about 0.1° K. When thermal link 220 becomes thermally conductive, the temperature of salt pills $P_1$ and $P_2$ equalize. Lastly, after the temperatures of the reservoir $P_2$ and the paramagnetic salt $P_1$ have equalized, the persistent current circulating in thermal switch 205 is destroyed. The removal of the magnetic field from thermal link 202 renders the link superconductive and thus thermally insulates the reservoir 203 from the salt 202. The cycle is now repeated to continue the extraction of heat from the reservoir 203. Note that the structure is arranged so that all heat flow is upwards, i.e., from $P_2$ to $P_1$ and from $P_1$ to reservoir 201.

A detailed description of the operation of a demagnetization refrigerator similar to that of Fig. 3 is contained in Heer, Barnes and Daunt's article "The Design and Operation of a Magnetic Refrigerator for Maintaining Temperatures Below 1° K.," Review of Scientific Instruments, vol. 25 No. 11, pages 1088–1098, November 1954.

The apparatus of Fig. 3 is a single stage refrigerator. In order to obtain even lower temperatures a second stage may be added below pill $P_2$, so that $P_2$ would serve as the high temperature reservoir of a second stage.

The operation of the thermal switch 204 and 205, in order to provide the cycle of operation of the demagnetization refrigerator, is illustrated by the diagram of Fig. 4. Fig. 4 depicts the current pulses applied to the thermal switches 204 and 205, the waveform of the current $I_m$ applied to magnet 234 and the temperature gradient of salt pills $P_1$ and $P_2$.

Referring to Fig. 4, the current $I_m$ is applied to magnet 234 during the interval $t_1$. During this interval, the paramagnetic salt pill $P_1$ is magnetized causing the temperature thereof to increase above 1° K. Beginning at time $t_2$, a current pulse $I_{2b}$ is applied to terminal 217 causing conductor 213 to be rendered normal. Simultaneously therewith, a current pulse $I_{2a}$ is applied to terminal 214 which establishes current flow through inductance 212. As indicated in Fig. 4, current $I_{2a}$ remains on after the cessation of $I_{2b}$ thereby inducing a persistent current in the loop comprising inductance 212 and conductor 213, in the manner described hereinbefore with respect to Fig. 2. Accordingly, the thermal link 208 is rendered normal by the field produced by the current flowing through inductance 212. The normalization of link 208 creates a thermal conductive path from salt pill $P_1$ to constant temperature reservoir 201. As indicated in Fig. 4 by the temperature $T_{p1}$, the temperature of pill $P_1$ equalizes to the temperature of the constant temperature reservoir 201. During interval $t_2$, the current $I_m$ remains constant and thus pill $P_1$ remains magnetized.

At the termination of interval $t_2$, a current pulse $I_{2b}$ is applied to terminal 217 (Fig. 3) which renders conductor 213 normal. The normalization of conductor 213 destroys the persistent current circulating in thermal switch 204. Also, the current $I_m$ begins to decrease toward zero during interval $t_3$. The decreasing current through magnet 234 (Fig. 3) demagnetizes salt pill $P_1$ which then cools to a temperature slightly below approximately 0.1° K.

At the commencement of time interval $t_4$, current pulses $I_{1a}$ and $I_{1b}$ are respectively applied to terminals 228 and 225 (Fig. 3) thereby inducing a persistent current in the superconducting loop comprising inductance 223 and conductor 224, in the manner described above. The persistent current in thermal switch 205 renders thermal link 220 normal so that a thermal conductive path is established between salt pills $P_1$ and $P_2$. Hence, during interval $t_2$, the temperatures of pills $P_1$ and $P_2$ equalize thereby decreasing the temperature of pill $P_2$. At the termination of interval $t_4$, a second $I_{1a}$ current pulse is applied to terminal 225 which destroys the persistent current circulating in thermal switch 205. The destruction of this current permits thermal link 220 to become superconducting so as to thermally insulate salt pills $P_1$ and $P_2$. This completes one cycle of the adiabatic demagnetization refrigerator of Fig. 3. During the interval $t_5$, work is not performed in the refrigerator. The duration of interval $t_5$ is dependent upon the frequency with which the cycle of the refrigerator must be repeated in order to maintain salt pill $P_2$ at approximately 0.1° K.

It is indicated in Fig. 3, that the temperature $T_{p2}$ of salt pill $P_2$ gradually rises from the beginning of the cycle through the end of interval $t_3$. During interval $t_4$, the temperature of salt pill $P_2$ is decreased since it is cooled to the temperature of pill $P_1$. At the conclusion of interval $t_4$, the temperature of salt pill $P_2$ increases until the occurrence of another interval similar to $t_4$. The temperature rise during intervals $t_1$ through $t_3$ of salt pill $P_2$ and also the frequency with which the cycle of the refrigerator must be repeated, is dependent upon the heat losses in the refrigerator of Fig. 3.

When the refrigerator of Fig. 3 is utilized to cool a substance to approximately 0.1° K., the substance is placed in thermal contact with salt pill $P_2$. An appropriate aperture or connection means in order to attach the substance to be cooled to $P_2$ must be provided, and such means is not illustrated in Fig. 3 since any well-known structure may be utilized.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. The invention, therefore, is to be limited only as indicated by the scope of the following claims.

What is claimed is:

1. An adiabatic demagnetization refrigerator comprising the combination of; a paramagnetic salt pill; means for alternately magnetizing and demagnetizing said salt pill, first means having a constant temperature; a first thermal valve coupling said first means and said pill for equalizing the temperatures thereof after said pill is magnetized; second means operated at a lower temperature than said first means; a second thermal valve coupling said pill and said second means for equalizing the temperatures thereof after said pill is demagnetized to thereby decrease the temperature of said second means; said first and second valves each comprising a superconductive element reacting as a thermal insulator and a thermal conductor when respectively in the superconductive and normal states, a superconductive loop magnetically coupled to said element for controlling the superconductive state of said element, means for inducing a current in said loop which persists therein without the further application of electrical energy to said loop to thereby render said element a thermal conductor, and means coupled to said loop for effecting the dissipation of a persistent current in said loop whereby said element is rendered a thermal insulator.

2. A magnetic refrigerator including the combination of, constant temperature means, a second temperature means operated at a lower temperature than said constant temperature means, a material having paramagnetic properties for producing a decrease in temperature, a first superconducting link thermally insulating said constant temperature means and said material, a second superconducting link thermally insulating said material and said second temperature means, first and second superconductive means for storing persistent currents and respectively coupled to said first and second links, first means for establishing a persistent current in said first superconductive means for a predetermined time interval to render said first link thermally conductive thereby equalizing the temperatures of said constant temperature means and said material, and second means for establishing a persistent current in said second superconductive means during a predetermined interval to render said second link thermally conductive thereby equalizing the temperatures of said material and said second temperature means.

3. An adiabatic demagnetization refrigerator including the combination of, a constant temperature reservoir, means including a paramagnetic salt for producing a temperature differential, means for alternately magnetizing and demagnetizing said salt, a first superconductive thermal switch controlled by a persistent current circulating in a closed superconducting path for controlling the flow of heat currents between said constant temperature reservoir and said salt, a low temperature reservoir, and a second superconductive thermal switch for controlling the flow of heat currents between said low temperature reservoir and said salt, whereby said first switch effects equalization of the temperatures of said constant temperature reservoir and said salt after the latter is magnetized and said second switch effects equalization of the temperatures of said salt and said low temperature reservoir after said salt is demagnetized.

4. A magnetic refrigerator having a predetermined cycle of operation including the combination of, a first means having a temperature in the superconductive region, a second means normally subsisting at a lower temperature than said first means, third means for producing a temperature drop, a first thermal valve coupling said first means and said third means for establishing the latter at the temperature of the former, said valve including means for storing a persistent current to control the thermal conductivity of said valve, and a second thermal valve for establishing a thermal connection between said second means and said third means when said third means subsides to its lowest temperature level, whereby said second means is cooled to a temperature below that of said first means during each cycle of operation.

5. A magnetic refrigerator for producing a temperature lower than a reference temperature including the combination of, means for achieving a predetermined temperature decrease from said reference temperature, a reservoir, and a thermal valve coupling said reservoir and said means for establishing said reservoir at the lowest temperature excursion of said means, said valve including a closed superconducting path for storing a persistent current to control the thermal conductivity of said valve.

6. A magnetic refrigerator for producing a temperature lower than a reference temperature including the combination of, means for achieving a predetermined temperature decrease from said reference temperature, a reservoir, and a thermal valve coupling said reservoir and said means for establishing the former at the lowest temperature excursion of the latter, said valve including a first superconductive element capable of acting as a thermal conductor and a thermal insulator, and a second superconductive element having two operative states and coupled to said first element for alternately rendering the latter a thermal conductor and a thermal insulator when said second element is respectively in its first and second states.

7. A magnetic refrigerator including the combination of, a constant temperature means, means including a paramagnetic material for achieving a temperature decrease, a first superconductive thermal switch rendered operative by a persistent current circulating in a closed superconducting path for establishing said paramagnetic material at said constant temperature, means maintainable at a lower temperature than said constant temperature, and a second superconductive thermal switch for establishing said last-named means at the lowest temperature excursion of said paramagnetic material.

8. A magnetic refrigerator including the combination of, constant temperature means, a second temperature means operated at a lower temperature than said constant temperature means, paramagnetic means for producing a temperature reduction, a first thermal valve connected between said constant temperature means and said paramagnetic means, a second thermal valve connected between said paramagnetic means and said second temperature means, said first and second thermal valves each including a superconductive element capable of assuming thermal conducting and thermal insulating states, a first superconductive means for controlling the thermal state of said superconductive element of said first valve, and second superconductive means for controlling the thermal state of said superconductive element of said second valve, whereby said first valve effects the equalization of the temperatures of said constant temperature means and said paramagnetic means prior to the latter effecting a temperature decrease and said second valve effects an equalization of the temperatures of said paramagnetic means and said second temperature means when the former has achieved its lowest temperature excursion.

References Cited in the file of this patent

"The Design and Operation of a Magnetic Refrigerator for Maintaining Temperature below 1 degree K." in the Review of Scientific Instruments, volume 25, Number 11, pages 1088–1098, November 1954.

"Magnetic Refrigerator," in Mechanical Engineering, pages 1088 and 1089, December 1955.